United States Patent [19]

Cargnello et al.

[11] Patent Number: 5,712,329
[45] Date of Patent: Jan. 27, 1998

[54] PROCESS FOR THE PRODUCTION OF A THERMALLY INSULATING MATERIAL ABLE TO WITHSTAND A TRANSIENT THERMAL STRESS, AND THE CORRESPONDING MATERIAL

[75] Inventors: Rémo Cargnello, Les Mureaux; Bertrand Carel, Paris, both of France

[73] Assignee: Cryospace L'Air Liquide Aerospatiale, Les Mureaux, France

[21] Appl. No.: 618,895

[22] Filed: Mar. 20, 1996

[30] Foreign Application Priority Data

Apr. 6, 1995 [FR] France ................................ 95 04097

[51] Int. Cl.[6] .................................................. C09K 21/14
[52] U.S. Cl. ............................ 523/179; 2/69; 428/921; 524/405; 524/413; 524/423; 524/425; 524/435
[58] Field of Search ...................... 524/405, 493, 524/413, 423, 425, 435; 523/179; 2/69; 428/921

[56] References Cited

U.S. PATENT DOCUMENTS

| | | | |
|---|---|---|---|
| 4,719,251 | 1/1988 | Dietkin et al. | 523/218 |
| 4,810,741 | 3/1989 | Kim | 524/405 |
| 4,814,371 | 3/1989 | Le Touche | 524/405 |

FOREIGN PATENT DOCUMENTS

| | | |
|---|---|---|
| 0 212 827 | 3/1987 | European Pat. Off. . |
| 0 230 831 | 8/1987 | European Pat. Off. . |
| 0 248 089 | 12/1987 | European Pat. Off. . |
| 0 347 309 | 12/1989 | European Pat. Off. . |
| 0 446 157 | 9/1991 | European Pat. Off. . |
| 0 551 855 | 7/1993 | European Pat. Off. . |

*Primary Examiner*—Ana Woodward
*Attorney, Agent, or Firm*—Oblon, Spivak, McClelland, Maier & Neustadt, P.C.

[57] ABSTRACT

To ensure the thermal protection of a structure or person exposed to a transient thermal stress, it is proposed that a material be produced by polymerizing a homogeneous mixture of 50 to 80 parts by weight of an elastomeric binder, 10 to 25 parts by weight of a silica charge and 18 to 45 parts by weight of a solubility agent containing 3 to 20 parts by weight of at least one structural water-saturated mineral charge and 15 to 25 parts by weight of structural water in excess.

10 Claims, 2 Drawing Sheets

PROCESS FOR THE PRODUCTION OF A THERMALLY INSULATING MATERIAL ABLE TO WITHSTAND A TRANSIENT THERMAL STRESS, AND THE CORRESPONDING MATERIAL

DESCRIPTION

Technical Field

The invention mainly relates to a process for the production of a thermally insulating material for protecting a structure exposed to a transient thermal stress. The invention also relates to the material obtained by this process.

In general terms, such a thermally insulating material can be used in all cases where an object or person is exposed to convective or radiative thermal stresses, whose duration will be limited by the intensity of the thermal stress, the nature of the support and the thickness of the thermally insulating material.

In connection with the thermal protection of an object, the material must therefore be used as a thermal protection covering, both on a thermally conductive structure (metal or composite material) and on a thermally insulating structure (insulating foam, etc.). In non-limitative manner, the thus protected structures can be vehicles or craft used in the aeronautical and space fields.

The material can also be used for protecting persons liable to be exposed to transient thermal stresses. It then forms at least part of the heat protection clothing such as the fire-protection suits worn by such persons.

Prior Art

Among the numerous existing, thermally insulating materials, are known materials formed by an elastomeric binder based on silicone and filled or charged with silica. Such materials are suitable for the thermal protection of a metal structure. Thus, said structure absorbs the heat transferred to it by conduction through the interface between the thermally insulating material and the structure.

However, the use of a layer of limited thickness (below 10 mm) of said material for protecting a thermally insulating structure such as an insulating foam based on polyvinyl chloride would lead to a rapid rise of the interface temperature. This would lead to a premature detachment of the material prior to the end of the thermal stress against which it is wished to protect the structure.

This disadvantage could be avoided by giving the thermally insulating material a considerable thickness exceeding 10 mm. However, this would lead to a weight increase which it is difficult to accept in the aeronautical and space fields.

Moreover, the existing heat protection materials generally have relatively limited mechanical flexibility characteristics and a resistance to tearing away, so that they are unsuitable for certain uses.

Certain existing materials also suffer from the disadvantage of a high density, which is very disadvantageous in the aeronautical and space fields, no matter what the thickness given to said material.

These disadvantages of lack of flexibility, thickness and weight are illustrated by EP-A-230 831. This document proposes producing a thermally insulating material by mixing disodium tetraborate decahydrate with an elastomeric binder. Under the conventional conditions described, it is impossible to obtain a homogeneous mixture. The first consequence of this non-homogeneous character of the mixture is to make the material brittle, which significantly limits its applications.

Another effect of the non-homogeneous character of the mixture is the inevitable presence of heat bridges, which makes its effectiveness very random, particularly when it is placed on a thermally insulating structure. Thus, the obtaining of a good effectiveness is conditioned by the use of a relatively large material thickness, which inevitably increases its weight.

DESCRIPTION OF THE INVENTION

The main object of the invention is an original process making it possible to produce a thermally insulating material having both a low thermal diffusivity delaying the heat transfer by conduction to the structure to be protected, a high heat resistance enabling it to return by radiation a significant part of the incident heat flow, a not very high density, good mechanical flexibility and breaking strength characteristics and a good ageing resistance.

According to the invention, this result is obtained by means of a process for the production of a thermally insulating material comprising the homogeneous mixing of 50 to 80 parts by weight of an elastomeric binder, 10 to 25 parts by weight of a silica charge and 18 to 45 parts by weight of a solubility agent containing 3 to 20 parts by weight of at least one structural water-saturated mineral charge and 15 to 25 parts by weight of structural water in excess and the polymerizing of said mixture.

In the mixture, the choice of the elastomer is mainly dictated by its resistance to high temperatures and its ease of implementation (mixing, polymerization at ambient temperature, etc.). The elastomer is also chosen in such a way as to have the minimum possible density, as well as particularly high mechanical strength and ageing resistance.

The main function of the silica charge is to increase the refractory performance characteristics of the material (resistance to high temperatures, low thermal conductivity) and reduce the density thereof.

In the preferred embodiment of the invention, the silica charge is in the form of a silica gel ($SiO_2$, $xH_2O$) in powder (levilite).

In the process according to the invention, it is the solubility agent which gives the mixture the homogeneous character indispensable for obtaining a non-brittle, flexible material having effective and reproducible thermal insulation properties for a minimum thickness and weight. Thus, due to the fact that the solubility agent comprises, apart from one or more mineral charges, structural water saturating these charges and structural water in excess, a really homogeneous mixture is reliably obtained due to the presence of the water in excess.

Under these conditions, a thermal stress suffered by the material obtained gives rise to the release and vaporization of the structural water normally fixed by the solubility agent. The corresponding reaction is endothermic. The temperature reached at the interface between the thermal protection material and the protected structure consequently remains limited to a range between 100° and 150° C., whilst the structural water remains present in the material.

The choice of the mineral charge or charges is based on the following criteria:
high water content,
low density,
high formation enthalpy,
water release temperature as close as possible to 100° C. (particularly when the structure to be protected is thermally insulating),
high solubility in water.

A solubility agent chosen in this way makes it possible to saturate with water the silica charge, in order to store the latent vaporization energy. As has already been stated, it contains a structural water-saturated chemical substance giving the material the indicated properties.

In general terms, any chemical product which is soluble in water and able to fix structural water can be used for the production of the solubility agent in the thermally insulating material according to the invention. As a non-limitative example, said chemical product can be chosen from the following group of mineral charges:

copper sulphate ($CuSO_4$, $5H_2O$)
sodium carbonate ($Na_2CO_3$, $10H_2O$)
cobalt chloride ($CoCl_2$, $6H_2O$)
cobalt nitrate ($N_2O_6Co$, $6H_2O$)
disodium tetraborate ($Na_2B_4O_7$, $10H_2O$)
cobalt sulphate ($CoSO_4$, $7H_2O$)
sodium sulphate ($Na_2SO_4$, $10H_2O$).

It should be noted that certain of the mineral charges given in this list are insoluble in water to less than 0.005%. During the production of the solubility agent, the temperature of the water is adjusted at the time of dissolving the mineral charge.

The invention also relates to the material obtained by the above process. When the material according to the invention is used as a covering on a structure to be protected, it can be applied to said structure either by bonding or by spraying.

BRIEF DESCRIPTION OF THE DRAWINGS

A preferred embodiment of the process according to the invention is described in greater detail hereinafter with reference to the attached drawings, wherein show.

DETAILED DESCRIPTION OF AN EMBODIMENT

For carrying out the different tests described hereinafter, the material according to the invention was prepared by mixing the constituents in the following proportions:
silicone elastomer: 50 to 80 parts by weight
levilite: 10 to 25 parts by weight
solubility agent: 18 to 45 parts by weight
whereof: ($H_2O$): 15 to 25 parts by weight
($C_0Cl_2,6H_2O$): 2 to 10 parts by weight
($Na_2SO_4,10H_2O$): 1 to 10 parts by weight The mixture was polymerized at ambient temperature.

In the considered example, the thus produced material was deposited by pouring on cylindrical, thermally insulating foam blocks based on polyvinyl chloride, with a diameter of 40 mm and a thickness of 20 mm and themselves located in crucible in cup form. The thickness of the thus formed covering on the foam blocks was, as a function of the samples, 2 or 4 mm.

Samples having the same characteristics were also produced, replacing the material according to the invention by an existing material. This thermally insulating material presently used in the aeronautical and space industries, is a silica-filled, silicone-based elastomer. At a temperature of 20° C., it has a conductivity of 0.12 W/m/°K, a specific heat of 645 Joules/K/°k and a density of 0.65. Its tensile strength is 1.4 MPa.

These characteristics are to be compared with those according to the invention, which has a density of 0.6 to 0.75, as a function of its production method. The material according to the invention also has a breaking strength of approximately 1 MPa and a considerable flexibility permitting 180° folding without breaking.

In order to carry out comparative tests, a temperature probe was placed in each sample at the interface between the material and the thermally insulating foam block, in order to monitor the temperature evolution at this level when the face of the foam block covered with the thermally insulating material was exposed to a controlled thermal stress.

During a first series of tests, a sample covered with a 4 mm thick layer of material according to the invention and a sample covered with a 4 mm thick layer of existing material were exposed, for approximately 60 seconds, to the heat flow of approximately 200 kW/m² supplied by a torch.

Figure 1:
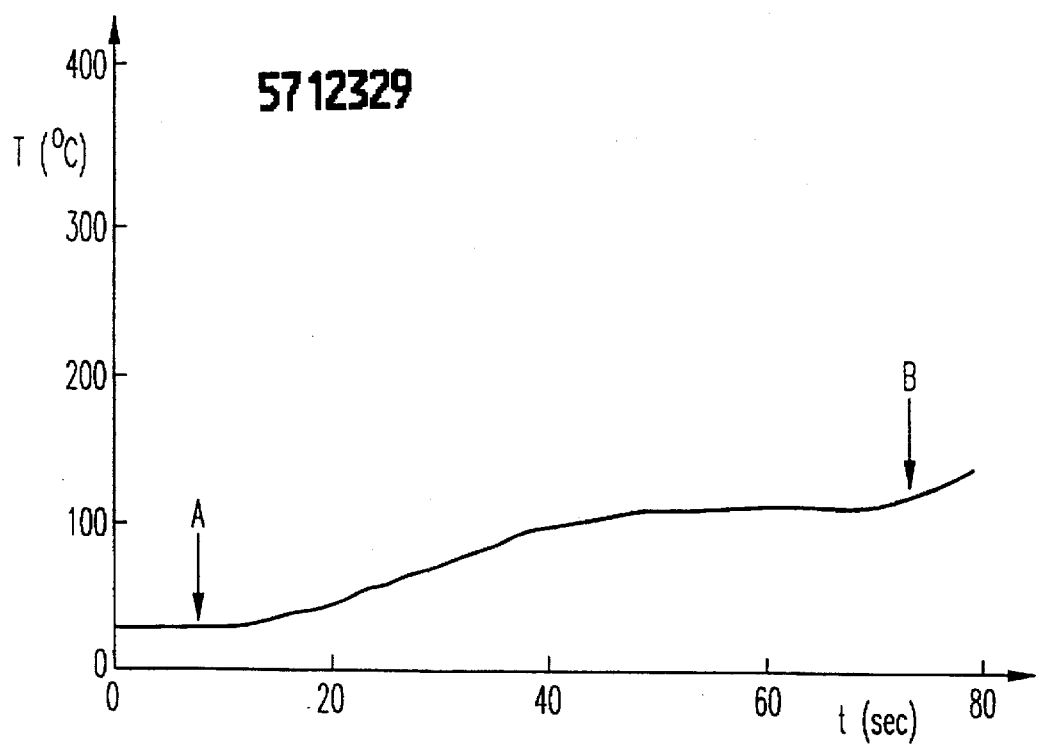
FIG. 1 A curve representing the evolution as a function of time t In sec.) of the temperature T (in °C.), at the interface between the material according to the invention and its insulating support structure in the case of a sample heated with a torch for approximately 60 sec.

As illustrated in FIG. 1, where the arrows A and B respectively correspond to the start and end of heating, the temperature T at the interface in the material according to the invention was approximately 130° C. after approximately 60 sec heating.

Figure 2:
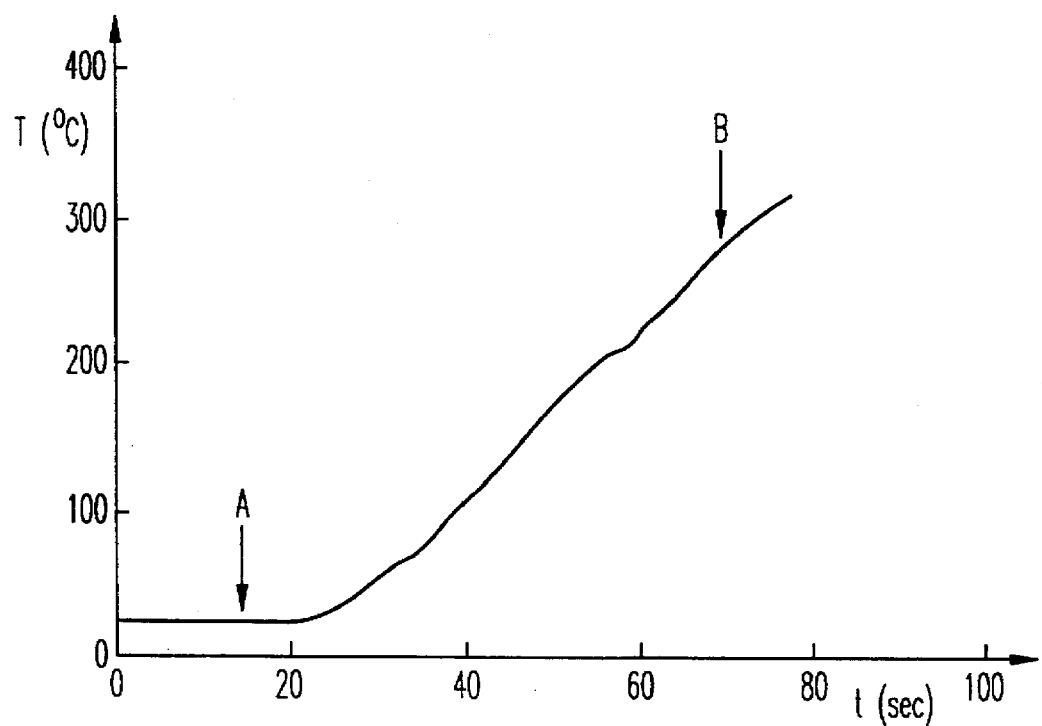
FIG. 2 A curve comparable to that of FIG. 1, in the case where a sample incorporating a prior art, thermally insulating material is heated under the same conditions.

Under the same conditions, FIG. 2 shows that the temperature T reached at the interface with the existing material was approximately 270° C. after the same heating period t (A and B once again representing the start and end of heating).

During a second series of tests, samples respectively incorporating a covering of a material, of thickness 2 mm according to the invention and a covering of an existing material with a thickness of 2 mm were subject to a heat flow of approximately 89 kW/m² supplied by a hot air gun providing air at a temperature of approximately 550° C.

Figure 3:
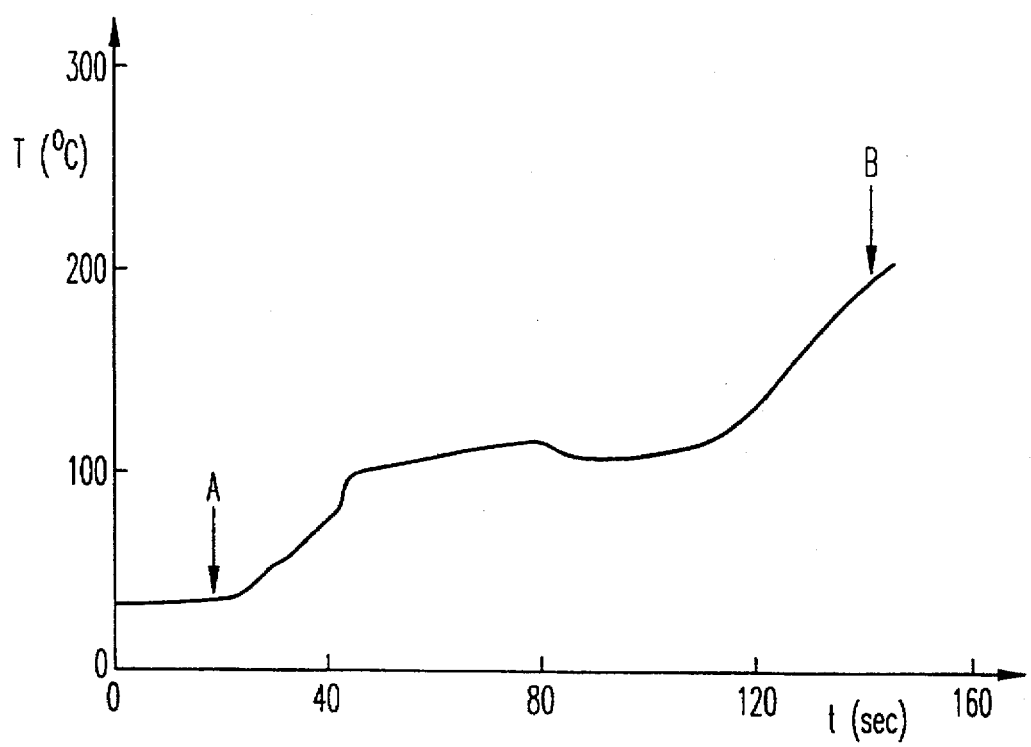
FIG. 3 A curve comparable to that of FIG. 1, in the case where a sample incorporating the material according to the invention is heated with a hot air gun for approximately 120 sec.
Figure 4:
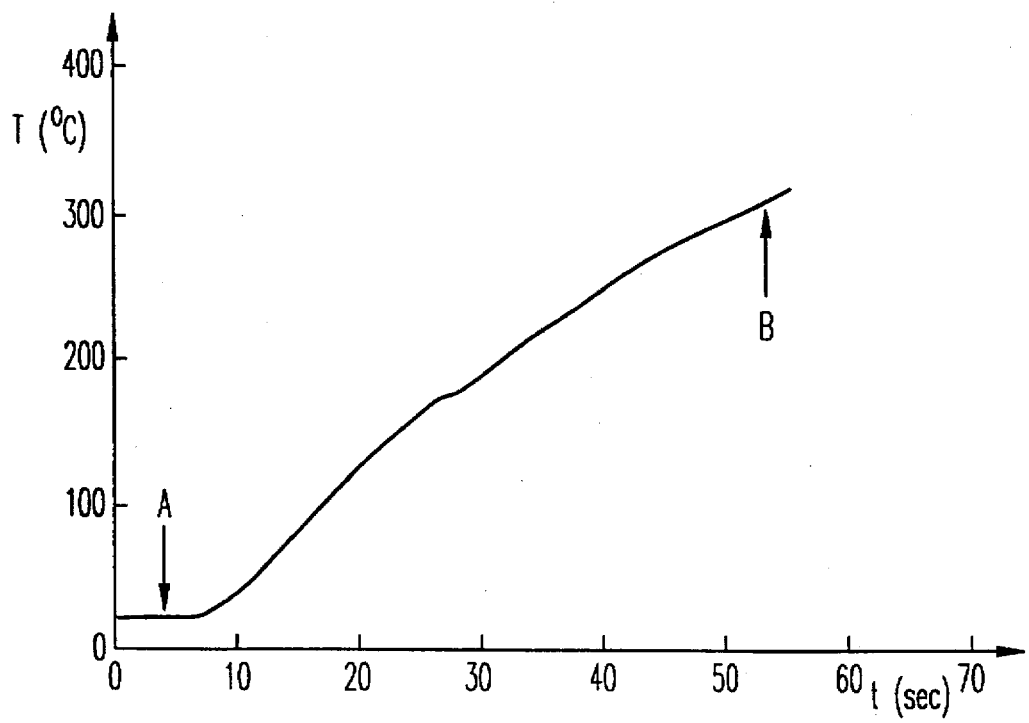
FIG. 4 A curve comparable to that of FIG. 3, in the case where a sample incorporating a prior art, thermally insulating material is heated with a hot air gun for approximately 50 sec.

As illustrated in FIG. 3, the interface temperature T reached with the material according to the invention was approximately 180° C. after approximately 120 s of heating (A and B representing the start and end of heating).

However, the use of the known material led to an interface temperature T of approximately 310° C. after only about 50 s heating (A and B representing the start and end of heating).

The results of these tests clearly illustrate the thermal performance characteristics of the material according to the invention compared with those of a material used at present in the aeronautical and space industries.

These tests also made it possible to observe that after exposure to thermal stresses, the material according to the invention had suffered surface removal, but retained its initial flexibility.

Study of FIGS. 1 and 3 shows that the thermally insulating material according to the invention has the property of delaying the heat transfer to the structure supporting it, whilst establishing a temperature plateau above 100° C. It is explained by the endothermic reaction due to the release and vaporization of the structural water contained in the material. The duration of the resistance of the material to the thermal stress to which it was exposed is higher in proportion to the structural water quantity fixed by the solubility agent.

The tests described hereinbefore confirm that the thermally insulating material according to the invention is able to withstand a transient thermal stress (1 to 2 min), materialized by a thermal flow or flux able to reach at least approximately 200 kW/m². Under these conditions, when the material is used as a heat protection covering on a structure, the interface temperature can be permanently maintained below 150° C., no matter what the nature of the structure, i.e. both in the case of a thermally conductive structure such as a metal structure or a composite structure and in the case of a thermally insulating structure such as a cellular structure of insulating foam based on polyvinyl chloride.

It should be noted that the relatively low density of the material according to the invention (between approximately 0.6 and 0.75 as a function of its production method) is very favourable to the use of the structure in the aeronautical and space industries.

As stated hereinbefore, it is pointed out that the thermally insulating material according to the invention can be used not only for the thermal protection of an insulating structure such as a launch vehicle wall, but also in the production of heat protection clothing such as fire-resistant suits (due to its capacity to withstand significant deformations without damage).

We claim:

1. A process for preparing a thermally insulating material, comprising the steps of:
   a) mixing to form a homogenous mixture:
      i) 50 to 80 parts by weight of an elastomeric binder, with respect to the total weight of the homogeneous mixture;
      ii) 10 to 25 parts by weight of a silica filler, with respect to the total weight of the homogeneous mixture; and
      iii) 18 to 45 parts by weight of a solubility agent, with respect to the total weight of the homogeneous mixture, said solubility agent comprising:
         3 to 20 parts by weight of a mineral salt saturated with water of hydration, with respect to the total weight of the homogeneous mixture, and
         15 to 25 parts by weight of water in excess of the water of hydration, with respect to the total weight of the homogeneous mixture; and
   b) polymerizing the elastomeric binder in the homogeneous mixture to provide a thermally insulating material.

2. The process of claim 1, wherein the mineral salt is cobalt chloride.

3. The process of claim 1, wherein the elastomeric binder is a silicone elastomer.

4. The process of claim 1, wherein the silica filler is levilite.

5. Process according to claim 1, wherein the mineral salt is selected from the group consisting of copper sulphate, sodium carbonate, cobalt chloride, cobalt nitrate, disodium tetraborate, cobalt sulphate, sodium sulphate, and mixtures thereof.

6. Process according to claim 1, wherein polymerization takes place at ambient temperature.

7. Process according to claim 1, wherein the silica filler is a powder silica gel.

8. Thermally insulating material comprising a polymerized, homogeneous mixture of 50 to 80 parts by weight of an elastomeric binder, 10 to 25 parts by weight of a silica filler and 18 to 45 parts by weight of a solubility agent containing 3 to 20 parts by weight of at least one structural water-saturated mineral salt and 15 to 25 parts by weight of structural water in excess.

9. A heat protection covering comprising a thermally insulating material prepared by the process of claim 1.

10. A heat protection garment comprising a thermally insulating material prepared by the process of claim 1.

* * * * *